United States Patent
Amari

(10) Patent No.: US 12,091,182 B1
(45) Date of Patent: Sep. 17, 2024

(54) AIRCRAFT HYBRID ELECTRIC PROPULSION ARCHITECTURE WITH GENERATOR-MOTOR FAIL MODE

(71) Applicant: RTX CORPORATION, Farmington, CT (US)

(72) Inventor: Martin Amari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/175,851

(22) Filed: Feb. 28, 2023

(51) Int. Cl.
| | | |
|---|---|---|
| B64D 31/00 | (2024.01) | |
| B60L 15/20 | (2006.01) | |
| B60L 50/60 | (2019.01) | |
| B64D 27/02 | (2006.01) | |
| B64D 27/24 | (2024.01) | |
| H02J 9/06 | (2006.01) | |

(52) U.S. Cl.
CPC .............. *B64D 31/00* (2013.01); *B60L 15/20* (2013.01); *B60L 50/60* (2019.02); *B64D 27/24* (2013.01); *H02J 9/061* (2013.01); *B60L 2200/10* (2013.01); *B64D 27/026* (2024.01)

(58) Field of Classification Search
CPC ...... B64D 31/00; B64D 27/24; B64D 27/026; B60L 15/20; B60L 50/60; B60L 2200/10; H02J 9/061
See application file for complete search history.

(56) References Cited

U.S. PATENT DOCUMENTS

| | | | |
|---|---|---|---|
| 6,931,850 B2 | 8/2005 | Frank et al. | |
| 8,424,800 B2 * | 4/2013 | Finney ................. | B64D 41/007 244/58 |
| 9,254,922 B2 | 2/2016 | Anderson et al. | |
| 9,446,842 B2 | 9/2016 | Luyks | |
| 10,427,527 B2 * | 10/2019 | Siegel ..................... | B60L 50/15 |
| 10,633,104 B2 * | 4/2020 | Miller .................... | B64D 27/24 |
| 11,053,019 B2 * | 7/2021 | Mackin .................. | B64D 27/24 |
| 11,192,458 B2 * | 12/2021 | Lavertu ................. | B60W 10/06 |
| 2016/0236790 A1 * | 8/2016 | Knapp .................... | B64C 11/44 |
| 2020/0062414 A1 * | 2/2020 | Hon ...................... | B60W 10/06 |
| 2020/0290742 A1 * | 9/2020 | Kumar .................. | B64D 27/24 |

(Continued)

FOREIGN PATENT DOCUMENTS

CN 110155344 B 1/2021

OTHER PUBLICATIONS

Search Report issued in European Patent Application No. 24160348.9; Application Filing Date Feb. 28, 2024; Date of Mailing Jul. 1, 2024 (5 pages).

*Primary Examiner* — Jared Fureman
*Assistant Examiner* — Michael J Warmflash
(74) *Attorney, Agent, or Firm* — CANTOR COLBURN LLP

(57) ABSTRACT

A hybrid electric propulsion (HEP) system included in an aircraft includes a generator configured to output a first power, an energy storage system configured to output a second power, a propulsion system configured to generate thrust based on at least one of the first power and the second power, and an HEP controller in signal communication with the generator, the battery, and the HEP system. The HEP controller is configured to detect loss of the first power output from the generator, to determine an altitude of the aircraft and to actively control delivery of the second power to the propulsion system based on the altitude during the loss of the first power.

18 Claims, 3 Drawing Sheets

(56) References Cited

U.S. PATENT DOCUMENTS

| | | |
|---|---|---|
| 2021/0171212 A1 | 6/2021 | Keller et al. |
| 2021/0394916 A1 | 12/2021 | Baig et al. |
| 2022/0048639 A1 | 2/2022 | Kamio et al. |
| 2022/0177144 A1 | 6/2022 | Klonowski et al. |
| 2022/0234748 A1* | 7/2022 | Mark ........................ F02C 9/00 |
| 2022/0363402 A1* | 11/2022 | Schenk ................. B60W 10/08 |

* cited by examiner

AIRCRAFT HYBRID ELECTRIC PROPULSION ARCHITECTURE WITH GENERATOR-MOTOR FAIL MODE

BACKGROUND

Exemplary embodiments of the present disclosure pertain to the art of aircraft propulsion systems, and more particularly to an aircraft hybrid electric propulsion (HEP) system.

Recent advances in electrical motors, energy storage systems, and power electronics converters (PEC) are leading aircraft propulsion to become increasingly electrical. Hybrid-electric propulsion (HEP) systems have been developed which implements electrical systems in place of one or more traditional aircraft mechanical systems. Fuel and battery sources, for example, may be implemented to allow more possibilities for managing the propulsion system in the various stages of a mission, and reduce fuel consumption, compared with traditional propulsion systems. The increase in electrical systems increases the overall load of the aircraft, and produces greater complexity in the operation. As such, proper management of the electrical components and combustion desirable to meet the environmental requirements and reduce the fuel consumption of the aircraft is necessary.

BRIEF DESCRIPTION

The above described and other features are exemplified by the following figures and detailed description.

According to a non-limiting embodiment, a hybrid electric propulsion (HEP) system included in an aircraft includes a generator configured to output a first power, an energy storage system including a battery configured to output a second power, and propulsion system configured to generate thrust based on at least one of the first power and the second power. The HEP system further includes an HEP controller in signal communication with the generator, the battery, and the HEP system. The HEP controller is configured to detect loss of the first power output from the generator, to determine an altitude of the aircraft and to actively control delivery of the second power to the propulsion system based on the altitude during the loss of the first power.

In addition to one or more of the above disclosed aspects of the system or as an alternate, the HEP controller operates the energy storage system in a normal battery mode in response to detecting the first power output from the generator and a generator-motor fail mode in response to detecting the loss of the first power.

In addition to one or more of the above disclosed aspects of the system or as an alternate, the HEP controller halts delivery of the second power to the propulsion system in response to invoking the generator-motor fail mode.

In addition to one or more of the above disclosed aspects of the system or as an alternate, the HEP controller delivers the second power to one or more select electrical systems included on the aircraft.

In addition to one or more of the above disclosed aspects of the system or as an alternate, the HEP controller compares the altitude to an altitude threshold and actively controls delivery of the second power to the propulsion system based on the comparison.

In addition to one or more of the above disclosed aspects of the system or as an alternate, the HEP controller operates the energy storage system in the generator-motor fail mode in response to the altitude being greater than the altitude threshold. The HEP controller operates the energy storage system in a landing battery mode in response to the altitude being equal to or less than the altitude threshold.

In addition to one or more of the above disclosed aspects of the system or as an alternate, the propulsion system includes at least one motor, and the HEP controller controls operation of the motor in response to invoking the generator-motor fail mode.

In addition to one or more of the above disclosed aspects of the system or as an alternate, controlling operation of the at least one motor includes controlling the propulsion system to spool down and windmill the at least one motor in response to invoking the generator-motor fail mode.

In addition to one or more of the above disclosed aspects of the system or as an alternate, the HEP controller delivers the second power to the propulsion system to drive at least one motor in response to invoking the landing battery mode following a determination that the altitude is equal to or less than the altitude threshold.

In addition to one or more of the above disclosed aspects of the system or as an alternate, the HEP controller dynamically changes the altitude threshold based on a change in at least one of a current energy capacity of the battery and a charge capacity of the battery.

According to another non-limiting embodiment, a method is provided to control an aircraft hybrid electric propulsion (HEP) system. The method includes outputting a first power from a generator, outputting second power from a battery included in an energy storage system, and generating, by a propulsion system, thrust based on at least one of the first power and the second power. The method further includes detecting, by an HEP controller in signal communication with the generator, the battery and the HEP system, loss of the first power output from the generator. The further includes determining, by the HEP controller, an altitude of the aircraft, and actively control delivery of the second power to the propulsion system by the HEP controller based on the altitude during the loss of the first power.

In addition to one or more of the above disclosed aspects of the system or as an alternate, the method includes operating, by the HEP controller, the energy storage system in a normal battery mode in response to detecting the first power output from the generator, and operating, by the HEP controller, the energy storage system in a generator-motor fail mode in response to detecting the loss of the first power.

In addition to one or more of the above disclosed aspects of the system or as an alternate, the method includes halting delivery of the second power to the propulsion system in response to invoking the generator-motor fail mode.

In addition to one or more of the above disclosed aspects of the system or as an alternate, the method includes delivering, by the HEP controller, the second power to one or more select electrical systems included on the aircraft.

In addition to one or more of the above disclosed aspects of the system or as an alternate, the method includes comparing, by the HEP controller, the altitude to an altitude threshold and actively controlling delivery of the second power to the propulsion system based on the comparison.

In addition to one or more of the above disclosed aspects of the system or as an alternate, the method includes operating, by the HEP controller, the energy storage system in the generator-motor fail mode in response to detecting the detecting the loss of the first power and the altitude being greater than the altitude threshold, and operating, by the HEP controller, the energy storage system in a landing battery mode in response to the altitude being equal to or less than the altitude threshold.

In addition to one or more of the above disclosed aspects of the system or as an alternate, the method includes controlling, by the HEP controller, at least one motor included in the propulsion system in response to invoking the generator-motor fail mode.

In addition to one or more of the above disclosed aspects of the system or as an alternate, controlling operation of the at least one motor includes controlling the propulsion system to spool down and windmill the at least one motor in response to invoking the generator-motor fail mode.

In addition to one or more of the above disclosed aspects of the system or as an alternate, the method includes delivering, by the HEP controller, the second power to the propulsion system to drive at least one motor in response to invoking the landing battery mode following a determination that the altitude is equal to or less than the altitude threshold.

In addition to one or more of the above disclosed aspects of the system or as an alternate, the HEP controller dynamically changes the altitude threshold based on a change in at least one of a current energy capacity of the battery and a charge capacity of the battery.

Any combination or permutation of embodiments is envisioned. Additional features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
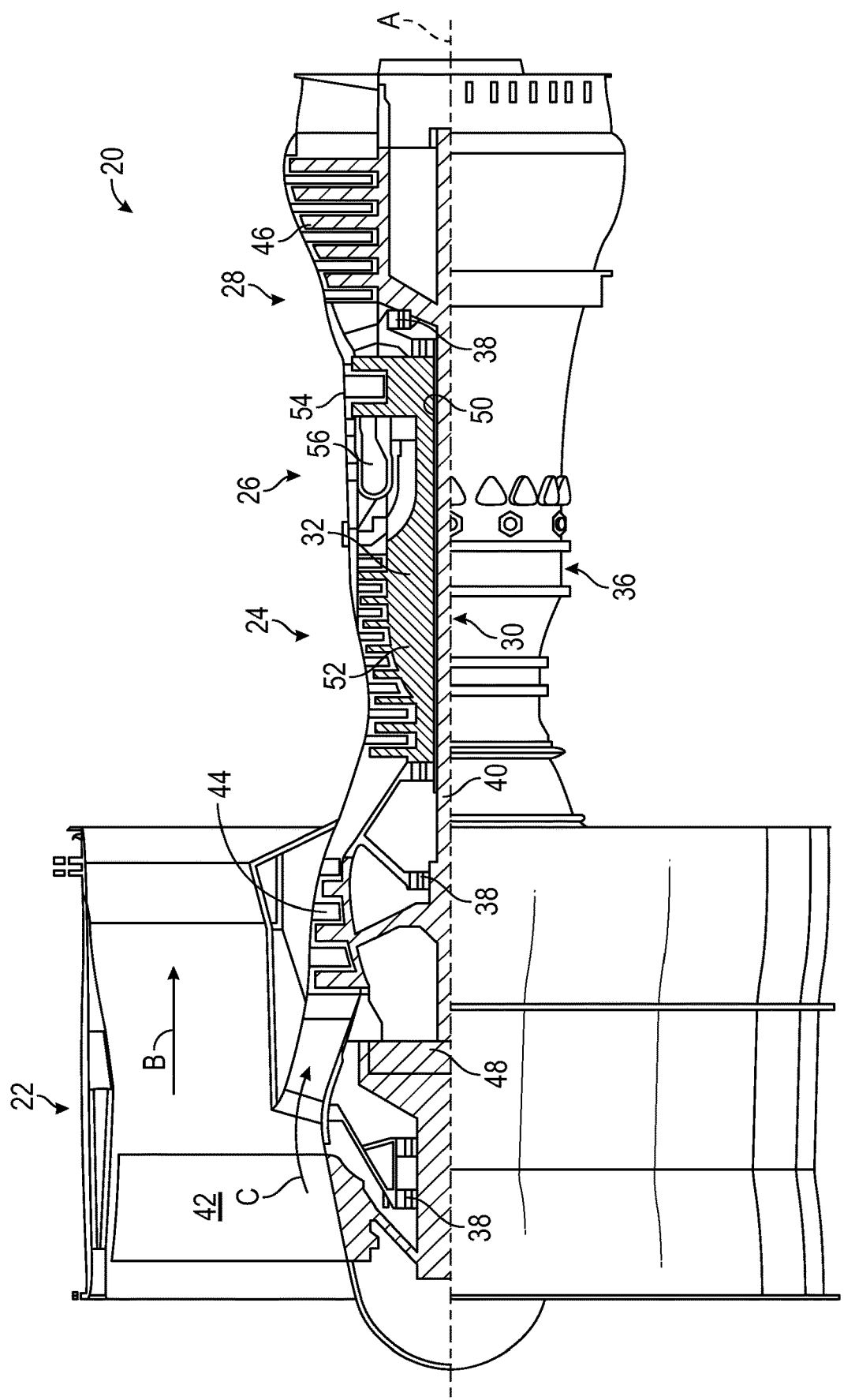
FIG. 1 is a block diagram depicting an aircraft hybrid electric propulsion (HEP) system according to a non-limiting embodiment of the present disclosure.

A detailed description of one or more embodiments of the disclosed apparatus and method are presented herein by way of exemplification and not limitation with reference to the Figures.

Aircraft hybrid electric propulsion (HEP) systems employ an energy storage system that typically includes a battery/capacitor system, which provides secondary power to various electrical loads on the aircraft. Conventional battery/capacitor systems typically operate for only a short amount of time and are not sized to fly an entire mission. Therefore, if power output from the generator stops, current hybrid propulsion system architectures forces the battery included in the energy storage system to power the propulsors and provide thrust for the aircraft in place of the generator, while also attempting to maintain power to aircraft electrical systems. However, the battery implemented in the aircraft energy storage system has a minimum size and energy capacity. Consequently, the battery will rapidly drain in a very short amount of time when operating to power the propulsors along with the aircraft electrical systems.

One or more embodiments of the present disclosure overcomes the shortcomings of conventional HEP systems by providing a HEP architecture that is capable of operating in a generator-motor fail mode. The generator-motor fail mode dynamically and actively controls power output and distribution of the energy storage system (e.g., the battery) based on altitude of the aircraft. The HEP system can include a supervisory controller (e.g., a HEP controller), which can detect the operating condition of the motor/generator along with the altitude of the aircraft. In response to loss of power output from the generator/propulsors, the HEP controller invokes a minimum battery power draw mode (i.e., a power reserve mode), which allows the battery to output power to one or more select electrical systems (e.g., electronic aircraft controls, landing gear system, flight surfaces, radar system, etc.) but not the motors. The HEP controller then controls the motors to spool down or windmill while the aircraft enters into a controlled descent.

When the aircraft reaches an altitude threshold with respect to the ground, the HEP controller invokes a normal battery mode and will allow the battery to output power to the aircraft electrical systems along with the motors to allow for a controlled landing. Accordingly, the generator-motor fail mode can facilitate minimal power consumption from the battery during loss of power from the generator, thereby preventing rapid drainage of the battery. The battery power can then be conserved until the aircraft reaches the altitude threshold where enough battery power remains that it can be used to provide sufficient thrust for performing a controlled landing.

As described herein, one or more non-limiting embodiments of the present disclosure provide a HEP system that includes a generator-motor fail mode that can be invoked in response to loss of power output from the generator/propulsors. When the generator-motor fail mode is invoked, the minimal power consumption from the battery is consumed until the aircraft descends to a target altitude. Once the target altitude is reached, the remaining battery power conserved during the generator-motor fail mode is utilized to power the propulsors along with the aircraft electrical system to perform a controlled landing.

With reference now to FIG. 1, a gas turbine engine 20 is schematically illustrated according to a non-limiting embodiment of the present disclosure. The gas turbine engine 20 is disclosed herein as a two-spool turbofan that generally incorporates a fan section 22, a compressor section 24, a combustor section 26 and a turbine section 28. In one or more non-limiting embodiments, the gas turbine engine 20 is implemented as a turbo-generator, where the gas turbine engine 20 is coupled with an electrically powered motor-generator. In one or more non-limiting embodiments, the turbo-generator is implemented as a gas turbine engine 20 which couples the turbo-generator to a spool (e.g., high speed spool, low speed spool, etc.). In some examples, the turbo-generator may include two or more motor generators, each motor-generator connected to a different spool (e.g., a first motor-generator coupled to a high speed spool and a second motor-generator coupled to a low speed spool.

The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]\{circumflex\ over\ (\ )\}0.5$. The "Low corrected fan tip speed" as disclosed herein according to one non-limiting embodiment is less than about 1150 ft/second (350.5 m/sec).

Figure 2:
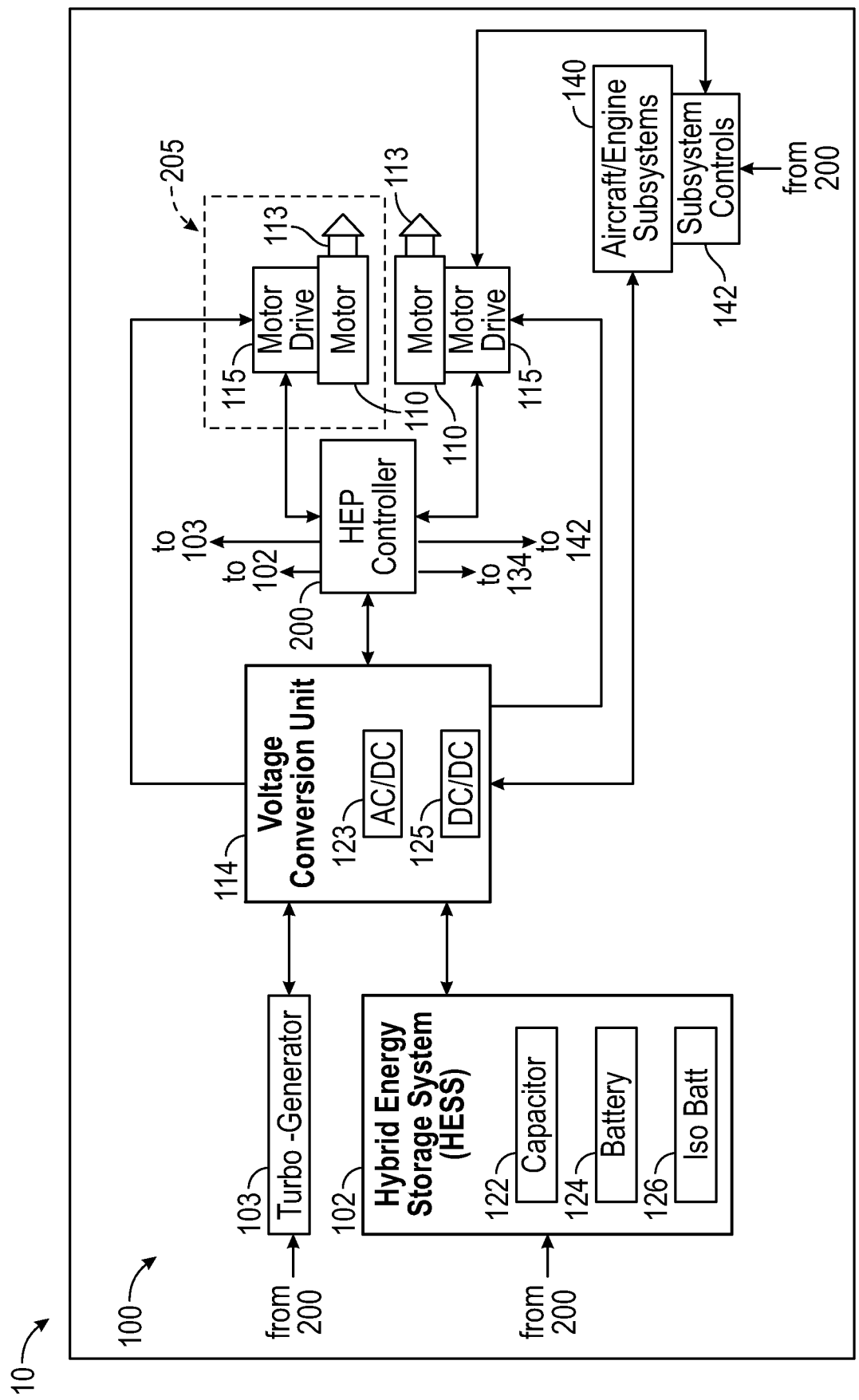
FIG. 2 is a block diagram illustrating a control system configured to enable various operating modes of an aircraft HEP system according to a non-limiting embodiment of the present disclosure.

Turning now to FIG. 2, an aircraft system 100 of an aircraft 10 is illustrated according to a non-limiting embodiment of the present disclosure. The aircraft 10 can include a pilot-operated aircraft or an autonomous aircraft (e.g., an unmanned aerial vehicle (UAV). The aircraft system 100 can include a hybrid energy storage system (HESS) 102, a turbo-generator 103, a propulsion system 205, and a HEP controller 200.

The HESS 102 includes one or more energy storage subsystems 102. The energy storage subsystems 102 can include at least two energy subsystems, for example, having a different power-energy density, power draw characteristics and/or dissimilar configuration/architecture to meet various types of power demands and fault protection with backup power sources. In one non-limiting example, the at least two energy storage subsystems can include a super/ultra-capacitor 122 and a battery 124 system. The battery system 124 is configured to store a limited amount of energy and discharge the stored energy to one or more electrical loads. The super/ultra-capacitor 122 can operate in conjunction with the battery 124 system to control the discharge rate of the energy discharged from the battery 122.

According to a non-limiting embodiment, the hybrid energy storage system 102 (e.g., the battery 124 and/or the capacitor 122) can be sized to store energy to support transient bursts of the turbo-generator 103 and/or the propulsion 205 for a power assist during a snap acceleration or power shedding during a snap deceleration. Using the energy storage subsystems 102, for example, for a wide range of acceleration and deceleration conditions can result in oversizing battery capacity with corresponding additional weight carried to meet potential transient demands. The super/ultra-capacitor 122, for example, can provide a lower storage capacity than the battery 124 but has a higher charge/discharge rate as compared to the battery 124.

The super/ultra-capacitor 122 can be comprised of one or more electrochemical double layer capacitors (EDLCs) or electrochemical capacitors that have a high energy density when compared to common capacitors, e.g., several orders of magnitude greater than a high-capacity electrolytic capacitor. The super/ultra-capacitor 122 can have higher energy efficiency due to a lower internal resistance than the battery system. The super/ultra-capacitor 122 can be operatively coupled to the battery 124 through a direct current (DC)-to-DC converter, for example. The DC-to-DC converter can convert a voltage level of the battery 124 to match a voltage level of the super/ultra-capacitor 122 to support charging of the super/ultra-capacitor 122 by the battery 124. In alternate embodiments, the DC-to-DC converter can be omitted where regulation between the super/ultra-capacitor 122 and the battery 124 is not needed.

According to a non-limiting embodiment, the HESS 102 can also implement a third energy storage system, which includes an isolated battery pack 126 accessible by the HEP controller 200 based on determining a mode of operation of the aircraft 10. For example, the aircraft mode of operations can include, but are not limited to, a ground-based power mode of operation, a normal battery mode, a generator-motor fail mode, and a landing battery mode. The ground-based power mode can be invoked when the aircraft is parked (e.g., at the gate) and/or while taxiing and minimal power is necessary to power select electrical systems such as, for example, the cabin cooling system. The normal battery mode can be invoked during normal flight operating conditions. In one or more non-limiting embodiments, during the normal battery mode, power is shared and is drawn as needed from the electrical loads. Accordingly, the battery system 124 discharges power, which drives select electrical systems utilized during the flight of the aircraft. The generator-motor fail mode can be invoked in response to loss of power output from the generator/propulsors during flight of the aircraft 10. In response to invoking the generator-motor fail mode, power draw from the battery system 124 is reduced to the minimum number of electrical systems until the aircraft reaches a target altitude. In this manner, energy capacity of the battery can be conserved until the aircraft 10 reaches an altitude at which the remaining amount battery power is capable of facilitating a controlled language. The landing battery mode can be invoked when the aircraft descent to an altitude threshold while operating in the generator-motor fail mode.

The propulsors 205 can receive power provided by the turbo-generator 103 and/or the HESS 102. According to a non-limiting embodiments, sources and electrical loads share a common power bus (not shown). If total consumption of the system exceeds the capability of the generator at the time, the HESS 102 (e.g., the battery 124) compensates for the power difference. Additionally, based on a determination that a fault with the turbo-generator 103 occurs (e.g., a generator-motor associated with turbo-generator 103 has failed) and the generator-motor fail mode is invoked, the HEP controller 200 can draw power from the HESS 102 to allow the aircraft 10 to achieve a controlled landing.

The generator-motor fail mode can be invoked in response to loss of power output from the generator/propulsors during flight of the aircraft 10. In response to invoking the generator-motor fail mode, power draw is reduced to the minimum number of electrical systems until the aircraft 10 is close to the ground, e.g., until an altitude threshold (e.g., 100 feet, 500 feet, 300 meters, etc.) is reached. When the altitude threshold is reached, the HEP controller 200 initiates a landing battery mode in which battery power is delivered to the propulsion system 205 so that thrust is restored, while the battery 124 discharges so that a controlled landing can be achieved. In at least one non-limiting embodiment, when the landing battery mode is invoked a substantial amount (e.g., 95%, 99.5%, etc.) of available energy stored in the battery and conserved while operating in the generator-fail mode is utilized to operate the propulsors for achieving a controlled descent.

For example, the generator-motor fail mode causes minimum battery power draw mode (i.e., a power reserve mode), which allows the battery to output power to select electrical system (e.g., electronic aircraft controls, landing gear system, flight surfaces, radar system, etc.) but not the propulsion system 205 (e.g., the motors 110). When the aircraft reaches an altitude threshold with respect to the ground, the energy storage system can be transitioned from the generator-motor fail mode to the landing battery mode, which allows the battery 124 to output power to the aircraft electrical systems along with the propulsion system 205 (e.g., the motors) to allow for a controlled landing. In some examples, HEP controller 200 may limit a number of systems to which the power from the battery 124 is drawn in the landing battery mode, such as to critical landing and operations systems (e.g., activating landing gear, vision systems (e.g., sensors, cameras, etc.) to assist with landing, etc.).

In one or more non-limiting embodiments, the HEP controller 200 can dynamically vary the altitude threshold based on current amount of energy stored in the battery. The HEP controller 200 can determine the current amount of energy stored based on the following equation:

energy capacity (Watt-hours)=charge capacity (amp-hours)×voltage (volts), where capacity is the total available charge capacity of the battery and the voltage is output voltage provided by the battery.

Accordingly, as HEP controller 200 can increase or decrease the altitude threshold as the energy capacity of the battery increases or decreases. In another example, the HEP controller 200 can dynamically vary the altitude threshold as the charge capacity changes. For example, the charge capacity of the battery may gradually decrease as the battery ages over time. Accordingly, the HEP controller 200 can adjust the altitude threshold as the charge capacity changes. In another example, an aging battery having a reduced charge capacity may be replaced with a new battery and/or larger-capacity batter that provides an increased charge capacity. Accordingly, the HEP controller 200 can dynamically adjust the altitude threshold based on the increased charge capacity of the replaced battery.

Additionally or alternatively, the HEP controller 200 can dynamically vary the threshold altitude based on terrain (e.g., mountains, hills, substantially flat terrain, water, etc.) over which the aircraft 10 is flying. For example, when flying over mountainous terrain, the HEP controller 200 may determine a first threshold altitude and when flying over substantially level terrain, the HEP controller 200 may determine a second threshold altitude that is lower than the first threshold altitude.

According to a non-limiting embodiment, one or more electric motors 110 are operably coupled to drive a respective fan 113. The combination of the motor 110 and fan 113 can be utilized at least partially with the gas turbine engine 20 to implement the propulsion system 205, also referred to herein as a "hybrid propulsor" 205. Each motor 110 is driven by a motor drive unit 115. Accordingly, increasing or decreasing the power delivered to the motor 110 increases or decreases, respectively, the thrust produced by the fan 113.

In the example of FIG. 2, the HESS 102 is operably coupled to a voltage conversion unit 114, which can include an AC-to-DC converter 123 and/or a DC-to-DC converter 125 that is operably coupled to the motor drive 115. The motor 110 and/or the motor drive 115 can include one or more motor sensors configured to output motor data indicative of operation of the motor(s) 115. The motor data can include, but is not limited to, motor speed, motor temperature, power consumption, and/or load demand (e.g., power demand).

The voltage converter unit 114 can also interface with a turbo-generator 103, a HEP controller 200, and or more aircraft electrical subsystems 140. According to a non-limiting embodiment, the turbo-generator 103 serves as the main power source, which generates power ultimately used to drive the propulsion system 205. The output generator voltage and its frequency varies based on the design of the turbo-generator 103 and engine speed. The voltage conversion unit 114 (e.g., the AC-DC converter 123) receives the unregulated energy from the turbo-generator 103 and converts it to a steady-steady DC voltage that can be used to drive various DC electrical loads (e.g., via the power bus).

One or more aircraft electrical subsystems 140 are operably coupled to the voltage conversion unit 114 and aircraft/engine subsystem controls 142. The aircraft electrical subsystems 140 can include, but are not limited to, an engine subsystem, an aircraft low-voltage DC subsystem, an aircraft high-voltage DC subsystem, an aircraft AC subsystem, a landing gear system, a navigation system, flight surface systems, and aircraft flight control systems. One or more of the subsystems included in the aircraft electrical subsystems 140 can also include one or more sensors configured to output monitored or sensed data associated with a respective subsystem and/or flight conditions of the aircraft. The sensed data can include, for example, aircraft speed, thrust, aircraft altitude, ambient temperatures, cabin pressure, etc.

The voltage conversion unit 114 can perform various voltage conversions needed to operate the devices and/or systems of the aircraft system 100. Although only one voltage conversion unit 114 is depicted, it should be understood that multiple voltage conversion units can be incorporated in the aircraft system 100 and that reference to the voltage conversion unit 114 can include one or more voltage conversion units within the aircraft system 100.

One or more of the voltage conversion unit 114, the motor drive 115, the generator controls 130, and or aircraft/engine subsystem controls 142 can include inverter/power drive circuitry that applies known power control techniques to control the power, current, speed and/or torque produced by one or more of the electric motor 110, AC/DC converter 123, DC/DC converter 125, generator 132, and aircraft/engine subsystems 140, respectively. For example, during a snap acceleration, electric power from the hybrid energy storage system 102 is provided through the voltage conversion unit 114 and the motor drive 115 (e.g., power conditioning electronics) to drive the electric motor 110 in a motor mode to supplement rotation of the engine shaft as opposed by an engine load. The engine load on the engine shaft, for example, can vary depending upon a flight regime and accessory loading from generators, environmental control systems, engine bleeds, and other known loading factors. During a snap deceleration, the generator 111 can be used to increase the engine load on the engine shaft, with resulting current passed through the voltage conversion unit 114 for storage in the hybrid energy storage system 102 or used elsewhere within the aircraft system 100.

The aircraft system 100 further includes a HEP controller 200, which is signal communication with the propulsion system 205, the HESS 102, the turbo-generator 103, and the aircraft/engine subsystem controls 142. The HEP controller 200 can also interface with and control multiple elements of the aircraft system 100 and the propulsion system 205, such as switches, current sensors, voltage sensors, temperature sensors, communication buses, and the like.

In an embodiment, the HEP controller 200 includes a memory system to store instructions that are executed by a processing system. The executable instructions may be stored or organized in any manner and at any level of abstraction, such as in connection with a controlling and/or monitoring operation of the aircraft system 100 and/or the propulsion system 205. The processing system can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 192 may include random access memory (RAM), read only memory (ROM), or other electronic, optical, magnetic, or any other computer readable medium onto which is stored data and control algorithms in a non-transitory form. Other controllers of FIG. 2 can include similar elements.

According to one or more non-limiting embodiments, the HEP controller 200 can monitor power output from the turbo-generator 103 based on a generator sensor (not shown) and/or power output generated by the voltage conversion unit 114. Based on the power output, the HEP controller 200 can operate the aircraft system 100 in either a normal battery mode when the turbo-generator 103 is operating normally and outputting power or one of a generator-motor fail mode or a landing battery mode in which the HEP controller 200 dynamically and actively controls output of the battery power to the HEP system 204 in response to loss of power from the turbo-generator 103.

When the HEP controller 200 detects power output from the turbo-generator 103, the HEP invokes the normal battery mode and controls the voltage conversion unit 114 (e.g., DC/DC converter 125) to output power generated by the battery 124 to the aircraft 10 electrical systems (e.g., aircraft subsystems 140) as needed.

When, however, the HEP controller 200 detects loss of power from the turbo-generator 103, the HEP controller 200 can control the voltage conversion unit 114 (e.g., DC/DC converter 125) to halt power generated by the battery 124, and output battery power to select electrical systems 140 such as, for example, electronic aircraft flight controls, landing gear systems, flight surface systems, and navigation systems (e.g., electrical flight control systems). When invoking the generator-motor fail mode, the HEP controller 200 can also control the propulsors 205 (e.g., the motors 110) to spool down and windmill to allow for a controlled descent. Accordingly, the minimum output battery power allows the HESS 102 to conserve battery power during the generator power loss.

During the controlled descent, the HEP controller 200 monitors the altitude of the aircraft 10 and compares the current altitude to an altitude threshold. When the current altitude is greater than the altitude threshold, the HEP controller 200 maintains the generator-motor fail mode and continues monitoring the altitude. When, however, the current altitude is equal to or lower than the altitude threshold, the HEP controller 200 engages the landing battery mode, to provide electrical power to the propulsors 205 (e.g., the motor drive 115 and/or the motors 110). Accordingly, the battery power conserved while operating in the generator-motor fail mode is output to the propulsors 205 (e.g., the motors 110) and the electrical systems 140 to allow for a controlled landing.

Figure 3:
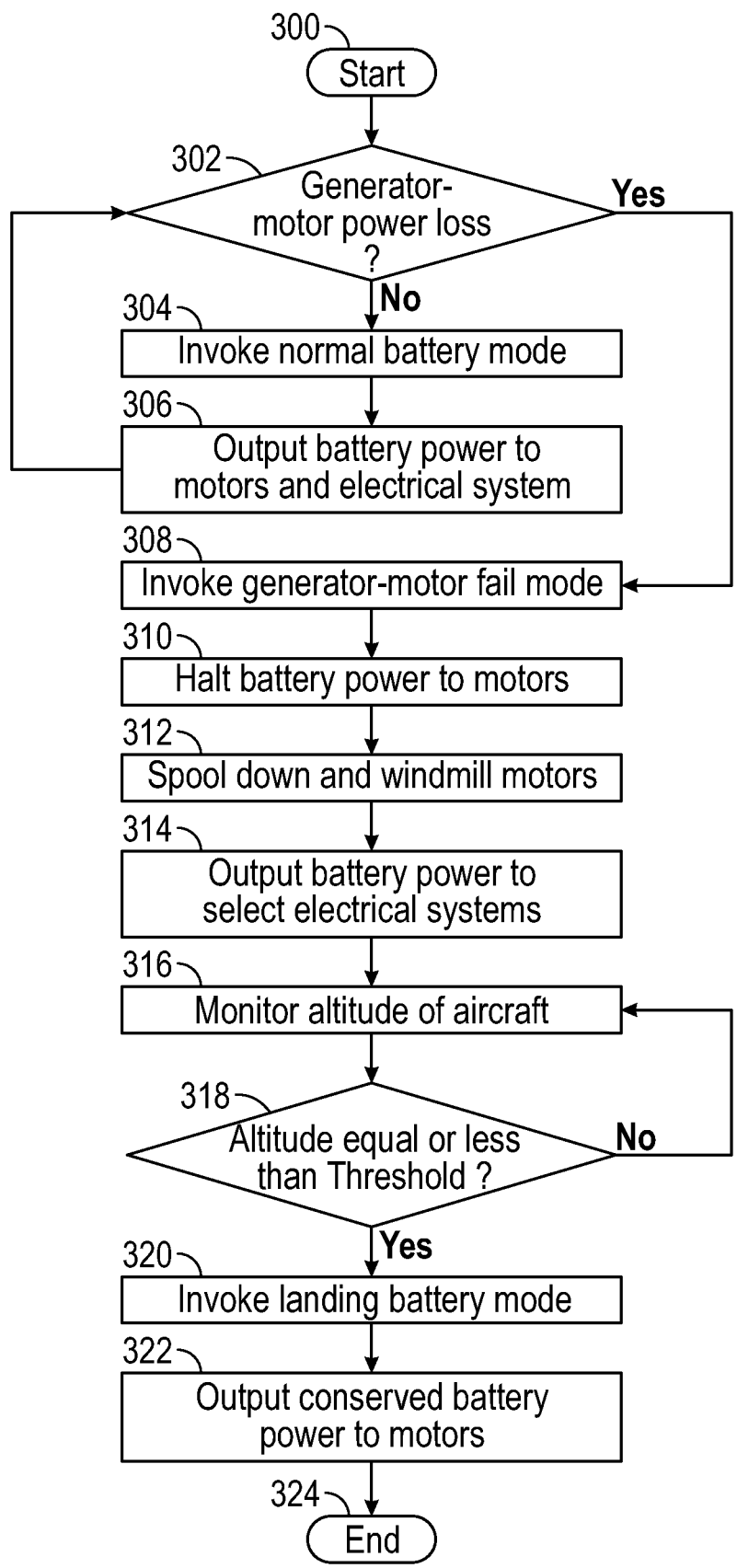
FIG. 3 is a flow diagram illustrating operations performed during a generator-motor fail mode according to a non-limiting embodiment of the present disclosure.

Turning to FIG. 3, a flow diagram illustrates operations performed during a generator-motor fail mode according to a non-limiting embodiment of the present disclosure. The method begins at operation 300, and determines whether the power loss of one or more generators has occurred at operation 302. When the generator(s) have not experienced power loss, a normal battery mode is invoked at operation 304. Accordingly, the battery delivers power to the motors and various electrical systems at operation 306 and the HEP controller can operate to manage the activity of the electrical system receiving the battery power to reduce or increase the load on the battery and generator(s). In addition, during the normal operating mode, the generator(s) can charge the battery system to prevent battery depletion. In one or more non-limiting embodiments, the aircraft can draw power from the battery system during high load conditions (e.g., take off), and the generators can operate to recharge the battery system during aircraft cruise. The method then returns to operation 302 to continue monitoring power output from the generator(s).

When power loss is detected at operation 302, however, a generator-motor fail mode is invoked at operation 308. At operation 310, battery power to the motors is halted and the propulsors (e.g., the motors) are controlled to spool down and windmill at operation 312. At operation 314, minimum battery power is output to select electrical systems. The electrical systems selected to receive battery power include, but are not limited to, electronic aircraft flight controls, landing gear systems, flight surface systems, and navigation systems. Accordingly, the minimum output battery power allows the battery to conserve power during a power loss of the generators.

At operation 316, the altitude of the aircraft is monitored and at operation 318 the current altitude is compared to an altitude threshold. When the current altitude is greater than the altitude threshold, the generator-motor fail mode remains in effect and the method returns to operation 316 to continue monitoring the altitude. When, however, the current altitude is equal to or less than the altitude threshold, the aircraft is transitioned from the generator-fail mode into a landing battery mode at operation 320. At operation 322, battery power is delivered to the motors and the method ends at operation 324. Accordingly, the battery power conserved while operating in the generator-motor fail mode can be used to power the motors and various electrical systems to allow for a controlled landing.

The term "about" is intended to include the degree of error associated with measurement of the particular quantity based upon the equipment available at the time of filing the application. For example, "about" can include a range of +8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A hybrid electric propulsion (HEP) system included in an aircraft, the HEP system comprising:
   a generator configured to output a first power;
   an energy storage system including a battery configured to output a second power;
   a propulsion system configured to generate thrust based on at least one of the first power and the second power; and
   a HEP controller in signal communication with the generator, the battery, and the HEP system, the HEP controller configured to detect loss of the first power output from the generator, to determine an altitude of the aircraft and to actively control delivery of the second power to the propulsion system based on the altitude during the loss of the first power; wherein the HEP controller operates the energy storage system in a generator-motor fail mode in response to detecting the loss of the first power and the altitude being greater than the altitude threshold, and wherein the HEP controller operates the energy storage system in a landing battery mode in response to the altitude being equal to or less than the altitude threshold.

2. The aircraft of claim 1, wherein the HEP controller operates the energy storage system in a normal battery mode in response to detecting the first power output from the generator and the generator-motor fail mode in response to detecting the loss of the first power.

3. The aircraft of claim 2, wherein the HEP controller halts delivery of the second power to the propulsion system in response to invoking the generator-motor fail mode.

4. The aircraft of claim 1, wherein the HEP controller delivers the second power to one or more select electrical systems included on the aircraft.

5. The aircraft of claim 4, wherein the HEP controller compares the altitude to an altitude threshold and actively controls delivery of the second power to the propulsion system based on the comparison.

6. The aircraft of claim 1, wherein the propulsion system includes at least one motor, and wherein the HEP controller controls operation of the motor in response to invoking the generator-motor fail mode.

7. The aircraft of claim 6, wherein controlling operation of the at least one motor includes controlling the propulsion system to spool down and windmill the at least one motor in response to invoking the generator-motor fail mode.

8. The aircraft of claim 7, wherein the HEP controller delivers the second power to the propulsion system to drive at least one motor in response to invoking the landing battery mode following a determination that the altitude is equal to or less than the altitude threshold.

9. The aircraft of claim 5, wherein the HEP controller dynamically changes the altitude threshold based on a change in at least one of a current energy capacity of the battery and a charge capacity of the battery.

10. A method of controlling an aircraft hybrid electric propulsion (HEP) system, the method comprising:
    outputting a first power from a generator;
    outputting second power from a battery included in an energy storage system;
    generating, by a propulsion system, thrust based on at least one of the first power and the second power; and detecting, by a HEP controller in signal communication with the generator, the battery, and the HEP system, loss of the first power output from the generator;

determining, by the HEP controller, an altitude of the aircraft; and actively control delivery of the second power to the propulsion system by the HEP controller based on the altitude during the loss of the first power; further operating, by the HEP controller, the energy storage system in a generator-motor fail mode in response to detecting the loss of the first power and the altitude being greater than the altitude threshold; and operating, by the HEP controller, the energy storage system in a landing battery mode in response to the altitude being equal to or less than the altitude threshold.

11. The method of claim 10, further comprising:

operating, by the HEP controller, the energy storage system in a normal battery mode in response to detecting the first power output from the generator; and operating, by the HEP controller, the energy storage system in the generator-motor fail mode in response to detecting the loss of the first power.

12. The method of claim 11, further comprising halting delivery of the second power to the propulsion system in response to invoking the generator-motor fail mode.

13. The method of claim 10, further comprising delivering, by the HEP controller, the second power to one or more select electrical systems included on the aircraft.

14. The method of claim 11, wherein the HEP controller compares the altitude to an altitude threshold and actively controls delivery of the second power to the propulsion system based on the comparison.

15. The method of claim 10, further comprising controlling, by the HEP at least one motor included in the propulsion system in response to invoking the generator-motor fail mode.

16. The method of claim 15, wherein controlling operation of the at least one motor includes controlling the propulsion system to spool down and windmill the at least one motor in response to invoking the generator-motor fail mode.

17. The method of claim 16, further comprising delivering, by the HEP controller, the second power to the propulsion system to drive the at least one motor in response to invoking the landing battery mode following a determination that the altitude is equal to or less than the altitude threshold.

18. The method of claim 11, wherein the HEP controller dynamically changes the altitude threshold based on a change in at least one of a current energy capacity of the battery and a charge capacity of the battery.

* * * * *